US008295295B2

(12) United States Patent
Winter et al.

(10) Patent No.: US 8,295,295 B2
(45) Date of Patent: Oct. 23, 2012

(54) SYSTEM AND METHOD FOR AUTOMATICALLY SEGMENTING AND MERGING ROUTING DOMAINS WITHIN NETWORKS

(75) Inventors: Timothy Clark Winter, Columbia, MD (US); Minakshisundaran Balasubramanian Anand, Germantown, MD (US); Prakash Chakravarthi, Gaithersburg, MD (US)

(73) Assignee: Cooper Technologies Company, Houston, TX (US)

( * ) Notice: Subject to any disclaimer, the term of this patent is extended or adjusted under 35 U.S.C. 154(b) by 1203 days.

(21) Appl. No.: 11/656,951

(22) Filed: Jan. 24, 2007

(65) Prior Publication Data

US 2008/0175257 A1  Jul. 24, 2008

(51) Int. Cl.
*H04L 12/28* (2006.01)
(52) U.S. Cl. ........ 370/411; 370/238; 370/216; 370/351; 455/560; 455/446; 455/447; 455/448; 455/449
(58) Field of Classification Search .................. 370/238, 370/216, 351; 455/445, 560, 446–449
See application file for complete search history.

(56) References Cited

U.S. PATENT DOCUMENTS

| | | | | |
|---|---|---|---|---|
| 5,841,990 | A * | 11/1998 | Picazo et al. .................. 709/249 |
| 6,278,883 | B1 * | 8/2001 | Choi .......................... 455/552.1 |
| 6,594,229 | B1 * | 7/2003 | Gregorat ........................ 370/219 |
| 6,731,639 | B1 | 5/2004 | Ors et al. |
| 6,791,949 | B1 | 9/2004 | Ryu et al. |
| 7,024,199 | B1 * | 4/2006 | Massie et al. ................ 455/445 |
| 7,184,421 | B1 * | 2/2007 | Liu et al. ...................... 370/338 |
| 7,486,662 | B2 * | 2/2009 | Sorrentino ..................... 370/352 |
| 7,689,224 | B2 * | 3/2010 | Chari et al. ................... 455/445 |
| 2002/0138604 | A1 | 9/2002 | Kopelovitz et al. |
| 2004/0008663 | A1 * | 1/2004 | Srikrishna et al. ............ 370/351 |
| 2004/0095932 | A1 * | 5/2004 | Astarabadi et al. ........... 370/389 |
| 2004/0240429 | A1 * | 12/2004 | Shen ............................ 370/351 |
| 2005/0111352 | A1 * | 5/2005 | Ho et al. ...................... 370/219 |
| 2007/0058607 | A1 * | 3/2007 | Mack-Crane et al. ......... 370/351 |
| 2007/0298805 | A1 * | 12/2007 | Basak et al. .................. 455/446 |
| 2008/0037532 | A1 * | 2/2008 | Sykes et al. .................. 370/389 |

OTHER PUBLICATIONS

"Dense cluster gateway based routing protocol for multi-hop mobile ad hoc networks" by R.K. Ghosh et al., Elsevier, Ad Hoc Networks, 1570-8705 © 2004 Elsevier B.V., pp. 168-185 (18 pages).
"An Optimised Gateway Selection Mechanism for Wireless Ad hoc Networks Connected to the Internet" by Mona Ghassemian et al., Centre for Telecommunications Research, King's College London, UK, DoCoMo Communications Laboratories Europe GmbH, Germany, 0-7803-9392-9/06 (c) 2006 IEEE, pp. 782-787 (6 pages).
International Search Report for related international patent application No. PCT/US2008/000636, mailed May 5, 2008, 2 pages.

* cited by examiner

*Primary Examiner* — Dwayne Bost
*Assistant Examiner* — Edward Zhang
(74) *Attorney, Agent, or Firm* — King & Spalding LLP

(57) ABSTRACT

A system and a method for automatically segmenting and merging routing domains within a network. The system includes one or more gateway devices and a plurality of nodes segmented into one or more routing domains. Each of said plurality of nodes maintains a single gateway device from among said plurality of gateway devices as the node's primary gateway at any time. Each of said gateway devices possesses a gateway color attribute. Each of said plurality of nodes maintains a node color attribute value whose value is derived from the value of said gateway color attribute of then node's primary gateway. Each node's routing domain is determined by the node's color attribute value.

26 Claims, 7 Drawing Sheets

SYSTEM AND METHOD FOR AUTOMATICALLY SEGMENTING AND MERGING ROUTING DOMAINS WITHIN NETWORKS

BACKGROUND

Large networks of wireless communication nodes are expected to play an increasingly important role in networking sensors or actuators for a variety of applications. These applications include, but are not limited to, seismic monitoring, precision agriculture, environmental and atmospheric monitoring, automated electricity, gas and water meter reading, industrial control and automation, etc. In all such networks, a wireless communication node is attached to a sensing or actuating device. Each wireless communication node will have limited range and will only be able to communicate with a few other nodes directly. In all such networks, the ad-hoc formation and maintenance of the network as new nodes join the network and nodes leave the network due to failure or removal is clearly a requirement. The routing of messages from any source node in the network to any other destination node over multiple intermediate nodes or hops is also a further requirement.

Further, all such networks also provide an access point or a gateway device which acts as an interface between the network of wireless communication nodes and a Wide Area Network (WAN). These gateway devices are typically provisioned with a radio device that allows it to form a part of and participate in the wireless network of nodes attached to sensors as well a network interface device that allows it to also form a part of and participate in a WAN. Examples of WANs include the Public Switched Telephone Network (PSTN), the Internet, the cellular communication network etc. Accordingly, the gateway device provides connectivity to the wireless network of sensors and actuators from a remote location. In this way, the data messages generated by the nodes can be communicated through the gateways to a central server or computer where they can be stored in a database for further processing or used to generate alarms or signals to other devices and systems. The reverse is true as well; commands generated by the central computer or server, either automatically or based on human interaction, are communicated through the gateways to the wireless node or nodes that they are directed to, where appropriate action such as reading the sensor or performing some control measure can be taken. As such, the gateways form an integral and critical part of the wireless network of sensors/actuators.

Many methods can be found in the art which relate to the problem of automatically forming and maintaining the wireless sensor network and to the problem of routing messages within such a network. Examples include U.S. Pat. No. 5,987,011, issued to Toh, U.S. Pat. No. 6,078,269, issued to Markwell, et al., and U.S. Pat. No. 5,553,094, issued to Johnson, et al., all of which are incorporated herein for reference. A very flexible and powerful method for the automatic formation of and dynamic routing of messages within such a network is described in U.S. Pat. No. 7,035,207, issued to the same inventors and assignee of the present application, and incorporated herein for reference.

A second aspect of a wireless sensor network relates to the problem of scalability as it pertains to data traffic. In particular, since the gateways are conduits through which most, if not all, of the data in a sensor network is conducted to and from a central location, the gateways constitute a bottleneck in any such network. This problem can be tackled by provisioning a sufficient number of gateways to handle all the data traffic. Combined with a flexible means of forming and maintaining the network, e.g., as described in U.S. Pat. No. 7,035,207, a powerful networking system can be built whereby the nodes can choose from among multiple gateways to transmit their data to, therefore, mitigating the problem of data traffic bottleneck at the gateways. Moreover, such a system also provides an increased measure of reliability since the nodes can switch automatically to a different gateway if any particular gateway device fails.

However, although such a system largely solves the problem of scalability as it relates to data traffic, it still contains an inherent shortcoming, relating to the problem of scalability as it pertains to storage of routing tables at the nodes. In a very large network containing hundreds of thousands of nodes, if each node were to maintain a flat routing table allowing it to route to any other node, the size of such a routing table becomes prohibitively large. One possible solution to this problem would be to manually split the whole network into multiple segments or sub-networks centered around each individual gateway. The nodes in any one sub-network would store in their routing tables only entries for other nodes in the same sub-network, consequently reducing total size of the routing tables. In such a scheme, the nodes in a sub-network can only route to other nodes in the same subnet; if they need to reach a node in another sub-network, they are required to communicate to the gateway for that sub-network, which can then route to other subnets.

Many such manual means of dividing the network into sub-networks are known in the art. For example, the well-known Internet Protocol (EP) allows the use of subnet masks, therefore letting a network administrator to perform manual configuration in order to divide the network into subnets. However, the use of such a subnet in large-scale wireless sensor networks introduces a shortcoming, which is that the nodes can no longer switch to a different gateway if required. As mentioned earlier, this capability is very desirable in order to provide a high degree of reliability when a gateway device fails, or when wireless link conditions change. There is then, a need for a system and method by which a large wireless sensor/actuator network can automatically segment itself into smaller sub-networks but at the same time allow each node in the network to retain the ability to join a sub-network as well as to switch to a different sub-network as needed.

SUMMARY

An advantage of embodiments described herein is that they overcome the disadvantages of the prior art. An advantage of embodiments described herein is that they provide a system and method by which a large wireless sensor/actuator network can automatically segment itself into smaller sub-networks but at the same time allow each node in the network to retain the ability to join a sub-network as well as to switch to a different sub-network as needed.

These advantages and others are achieved by a system for automatically segmenting and merging routing domains within a network. The system includes one or more gateway devices and a plurality of nodes segmented into one or more routing domains. Each of said plurality of nodes maintains a single gateway device from among said plurality of gateway devices as the node's primary gateway at any time. Each of said gateway devices possesses a gateway color attribute. Each of said plurality of nodes maintains a node color attribute value whose value is derived from the value of said gateway color attribute of the node's primary gateway. Each node's routing domain is determined by the node's color attribute value.

These advantages and others are also achieved by a method for automatically segmenting and merging routing domains within a network. The network includes one or more gateway devices and a plurality of nodes. The method includes providing a local routing table at each of said nodes and gateway devices, providing a gateway color attribute in each gateway device, setting the gateway color attribute in each gateway device to a value, each of said nodes selecting a gateway device as said node's primary gateway, and each of said nodes setting a node color attribute whose value is derived from the value of the gateway color attribute of said node's primary gateway.

These advantages and others are also achieved by a method for dynamically segmenting a network into multiple sub-networks or routing domains. The network includes one or more gateway devices and a plurality of nodes. The method includes providing a local routing table at each of said nodes and gateway devices, providing a gateway color attribute in each gateway device, setting the gateway color attribute in each gateway device to a value, each of said nodes selecting a gateway device as its primary gateway, each of said nodes setting a node color attribute whose value is equal to the value of the gateway color attribute of its primary gateway, each of said nodes obtaining routing information from other nodes and gateway devices in the vicinity and discarding routing information describing destination nodes whose node color attribute value is not equal to its own node color attribute value, and each of said gateway devices obtaining routing information from other nodes and gateway devices in the vicinity and discarding routing information describing destination nodes whose node color attribute value is not equal to its own gateway color attribute value.

DESCRIPTION OF THE DRAWINGS

The detailed description will refer to the following drawings, wherein like numerals refer to like elements, and wherein.

DETAILED DESCRIPTION

Described herein are a system and method for automatically segmenting and merging routing domains within networks. As noted above, systems known in the art at present suffer numerous problems, including an inherent shortcoming relating to the problem of scalability as it pertains to storage of routing tables at the nodes. Current systems overcome this shortcoming by manually dividing a network into sub-networks using subnet masks. However, as noted, the use of such a subnet in large-scale wireless sensor networks introduces another shortcoming, which is that the nodes can no longer switch to a different gateway if required. The embodiments described herein overcome these shortcomings.

In the embodiments described herein, it is assumed that each node in a network of wireless communication nodes is provided with the ability to discover the existence of other nodes within wireless transmission and reception range. Such ability is typically provided by the link management layer in a wireless communication system and is well known in the art. The terms "adjacent node" or "nodes in the vicinity" are used in the embodiments described herein to refer to all such nodes which are within wireless transmission and reception range of a node. It is further assumed that each node in the network is provided with an identifier uniquely identifying the node in the entire network. Such unique identifiers or addresses are also well-known in the art.

Figure 1:
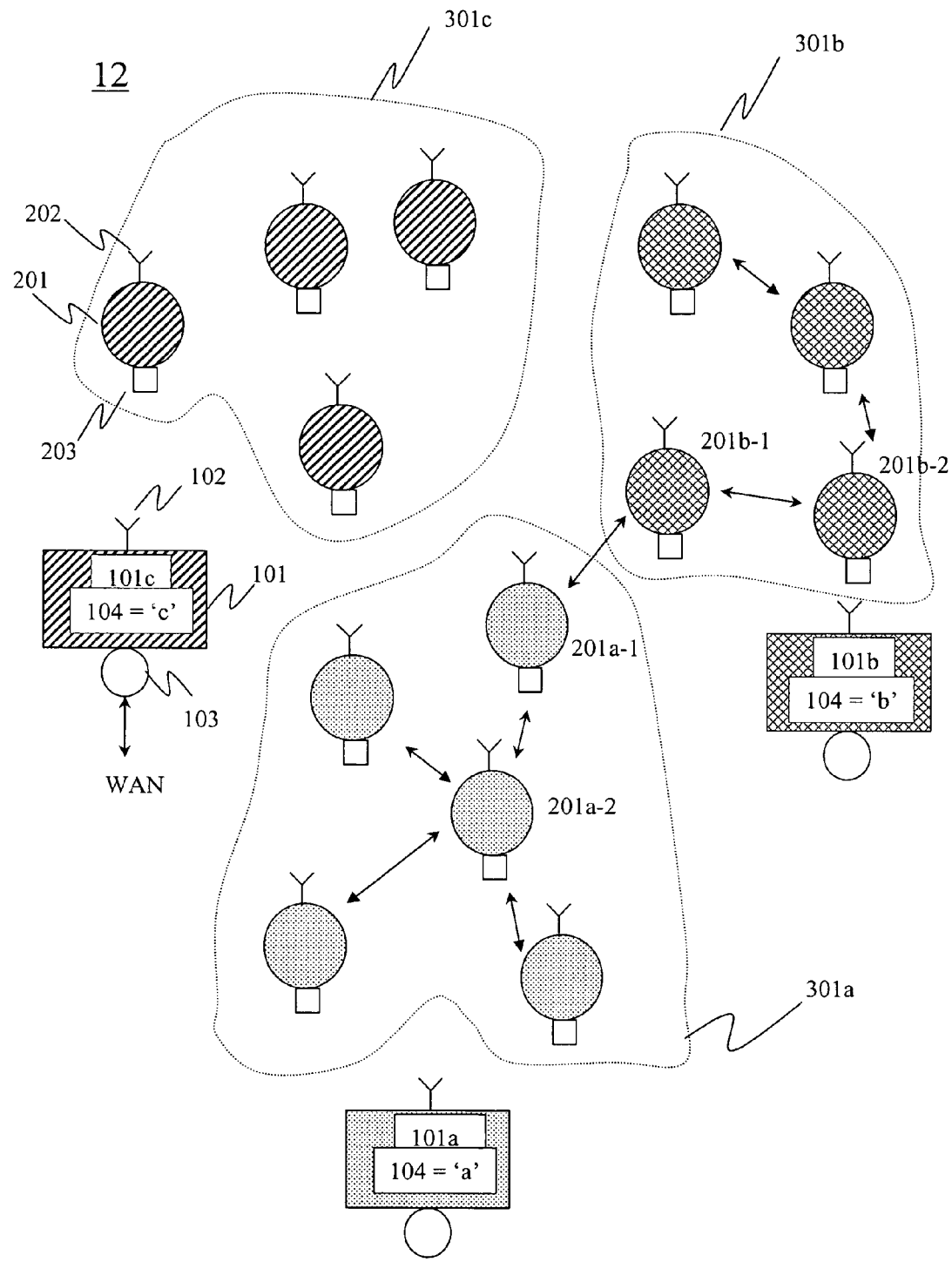
FIG. 1 is a block diagram illustrating an embodiment of a system for automatically segmenting and merging routing domains within networks.

With reference now to FIG. 1, shown is an embodiment of system for automatically segmenting and merging routing domains within networks. Network 12 of wireless nodes 201 connected to sensors or actuators 203 is shown. Network 12 includes one or more gateways 101 and nodes 201. Gateways 101 are provided with radio devices 102 that enable gateways 101 to communicate with nodes 201. Gateways 101 are also provided with network interface devices 103 that allow gateways 101 to communicate over a Wide Area Network (WAN) to a central server or computer (not shown). Nodes 201 are also provided with radio devices 202 that enable nodes 201 to communicate with each other as well as with gateways 101. Nodes 201 are attached to sensor or actuator devices 203.

Each gateway 101 in system is further provided with attribute 104 that is typically stored in gateway 101. Attribute 104 may be stored using non-volatile means that are well known in the art, such as flash memory or hard disk. In general, the value of attribute 104 is set to be unique for each gateway 101, although there is no requirement to do so. As will be seen below, setting attribute 104 value to be unique allows the automatic segmentation of network 12. Conversely, if attribute 104 value is the same for two gateways 101 which form adjacent (sub-)networks, a larger merged network is automatically produced. The value of attribute 104 could be assigned to each gateway 101 uniquely when gateway 101 is manufactured or assigned when gateway 101 is operational in a network. Furthermore, the value of attribute 104 could be automatically selected by gateway 101 as well. For example, each gateway 101 could select a random value for attribute 104 when gateway 101 first becomes operative. Although such a mechanism would not guarantee that the randomly picked value is unique in network 12, if the allowable range of values for attribute 104 is allowed to be sufficiently large, the mechanism would yield a very low probability that any two gateways 101 would pick the same value if an appropriate statistical distribution is used. Moreover, a combinational approach to setting attribute 104 values could be used as well. Consequently, gateways 101 could initially pick a random value but subsequently, if any two gateways 101 are detected to have to picked the same value, manual intervention could be employed to change the value so that the values are unique.

Each gateway's 101 attribute 104 is termed the "color" of gateway 101 and has a unique value for each gateway 101 in network 12. The use of the term "color" for attribute 104 is only for the purpose of intuitively understanding the embodiments of system and method for automatically segmenting and merging routing domains within networks described herein and must not be interpreted in a literal manner. For example, attribute 104 could equally well be referred to as a "marking" of gateways 101. The central idea is simply that each gateway 101 in a system for automatically segmenting and merging routing domains within networks possesses an attribute 104 whose value is distinct for each gateway 101 in the system. Therefore, for example, in FIG. 1, the colors of the three gateways 101a, 101b and 101c are, respectively, 'a', 'b' and 'c'. It should be noted the use of 'a', 'b' and 'c' for the color values is for illustrative purposes only; e.g., numbers such as 10, 20, 30 could equally well be used for the same purpose as well. The color of each gateway 101 is also indicated in FIG. 1 through the means of shading the respective gateways in a different manner.

With continuing reference to FIG. 1, each of nodes 201 shown in network 12 periodically exchanges network routing information with each of the other nodes 201 in its vicinity. Through such exchanges of routing information, each node 201 learns of paths to destination nodes in network 12 that it, by itself, cannot directly reach. Each node 201 then builds a routing table, e.g., in the node 201 internal memory, of the path to use to reach each destination. Furthermore, the routing information exchanged between nodes 201 could include information pertaining to the quality of the wireless communication links as well as the number of intermediate hops needed to reach a destination, consequently allowing each node 201 to select the best path from among potentially many different paths to a destination. Embodiments described herein may utilize mechanisms and methods of exchanging routing information, learning of paths to various destinations and arriving at decisions on the optimal path to destination that are well known in the art.

Through such means each node 201 learns of the existence of and the paths to the various gateways 101 in network 12. From among the many different gateways 101 available in network 12, each node 201 then selects a single gateway 101 to use as its primary gateway. The decision on which gateway 101 to choose as the primary gateway could be based on any one of multiple factors or a combination of multiple factors. Node 201 could, for example, use the number of hops to gateway 101 as the determining factor, choosing gateway 101 it can reach with the least number of hops as the primary gateway. Alternatively, node 201 could use wireless link quality information to choose as its primary gateway the gateway 101 with best overall link quality over the entire path to the gateway 101. Likewise, node 201 could use traffic factors in choosing the primary gateway. Node 201 could also use a combination of any or all of these factors through some appropriate weighting scheme as well to choose its primary gateway. Once node 201 chooses a primary gateway, node 201 colors itself to be of the same color as its primary gateway. Therefore, the color of each individual node 201 is the same as the color of gateway 101 which it has selected as its primary gateway. This is indicated in FIG. 1 through the shading of the respective nodes 201 in a different manner. Accordingly, nodes 201 color themselves into three groups or segments, 301a, 301b and 301c depending on gateway 101 they have chosen as their primary gateway.

A central benefit of the embodiments described herein can now be seen by considering how nodes 201 exchange and store routing information. With continuing reference to FIG. 1, consider nodes 201a-1, 201a-2, 201b-1 and 201b-2. Nodes 201a-1 and 201a-2 have chosen gateway 101a as their primary gateway and nodes 201b-1 and 201b-2 have chosen gateway 101b as their primary gateway. As described earlier, nodes 201 communicate with each other and exchange routing information, therefore learning about destinations not directly reachable by themselves and eventually building a routing table of all such destinations and the paths to reach those destinations. Consequently, for example, when node 201a-1 communicates with node 201a-2, it learns about all nodes 201 in group 301a and knows that they are all reachable through node 201a-2. Similarly, when node 201b-1 communicates with node 201b-2, it learns about all nodes 201 in group 301b and knows that they are all reachable through node 201b-2. However, when node 201a-1 communicates with node 201b-1 and exchanges routing information, or vice versa, the color of the destinations is used to differentiate between which destinations to add to the routing table and which not. As a result, node 201a-1 will not add to its local routing table any of the destinations in group 301b that node 201a-1 learns from node 201b-1 because these destinations are not of the same color 'a' as node 201a-1. Similarly, node 201b-1 will not add to its local routing table any of the destinations in group 301a that node 201b-1 learns from node 201a-1 because these destinations are not of the same color 'b' as node 201b-1. Accordingly, it is seen that the local routing table in each node 201 is restricted to destinations that are of the same color as node 201, therefore allowing for the automatic segmentation of network 12 based on the colors.

Therefore, it is seen that through the use of the color attribute the entire network 12 has been segmented into multiple sub-networks or routing domains (e.g., groups 301a, 301b, and 301c), one for each unique color value. It is also seen that nodes 201 only maintain routing table entries within the same sub-network or domain as themselves, therefore mitigating the problem of scalability as it pertains to the size of the routing tables. Furthermore, it is seen that setting the color attribute value to be same in two gateways 101 can produce a larger meshed sub-network. For example, in FIG. 1, if the color attribute value is set to be the same in gateways 101a and 101c, the sub-networks 301a and 301c will actually be one single larger sub-network or routing domain.

Figure 2:
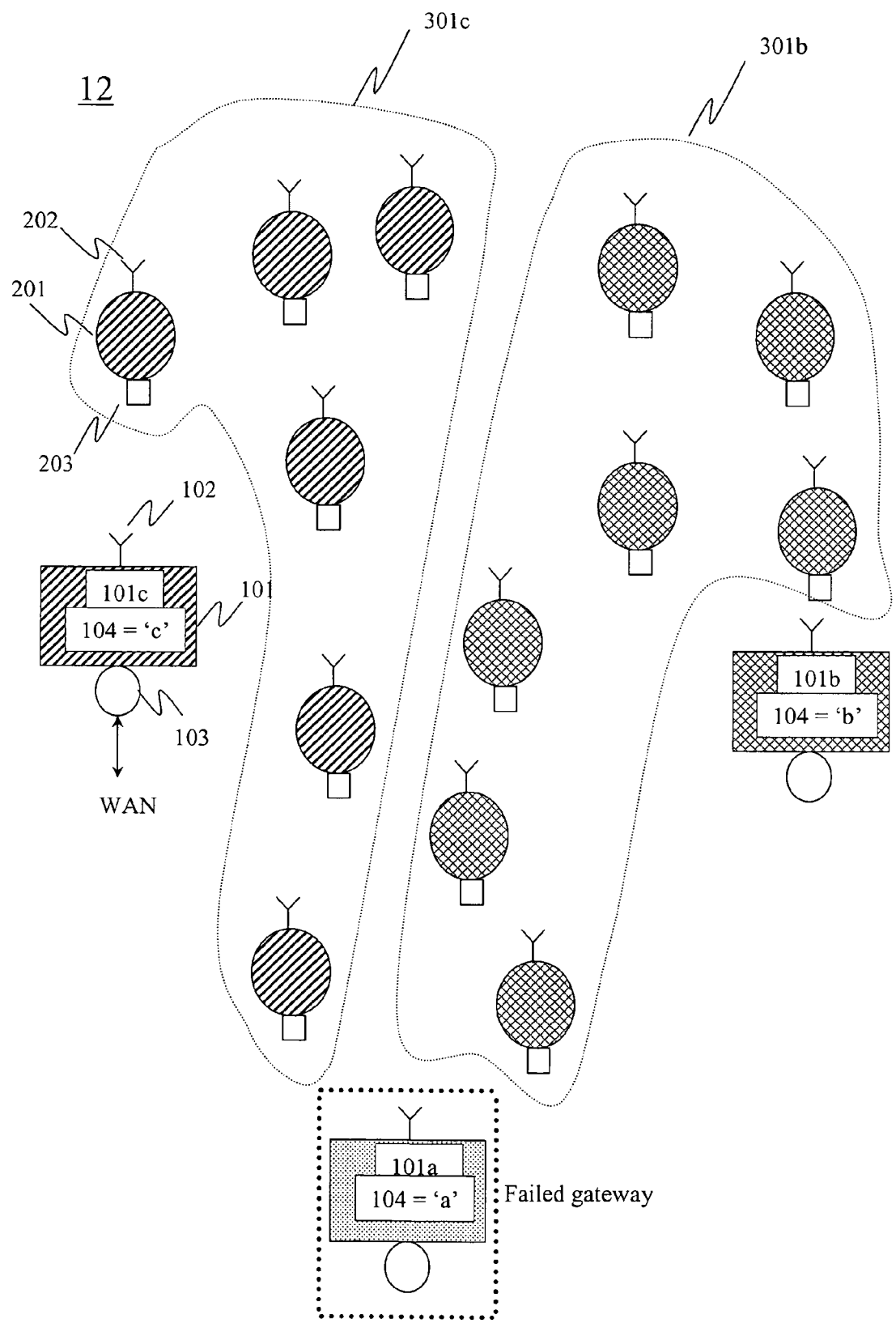
FIG. 2 is a block diagram illustrating an embodiment of a system for automatically segmenting and merging routing domains within networks.

It must be noted carefully, though, that the coloring of the nodes is self-initiated and dynamic in nature. This fact allows the automatic switching of the color of nodes 201 and thus the merging of segments (i.e., groups 301) which can happen, when for example, a gateway 101 fails. With reference now to FIG. 2, shown is an embodiment of system for automatically segmenting and merging routing domains within networks if the gateway 101a fails. Nodes 201 (i.e., nodes 201a) that had selected gateway 101a as their primary gateway would detect this and select other gateways 101 as their primary gateway. Depending on the selection criteria used by nodes 201 to select their primary gateway, some of nodes 201 in the original group 301a could select gateway 101b as their primary gateway and color themselves 'b', therefore becoming part of group 301b. Other nodes 201 in the original group 301a could select gateway 101c as their primary gateway and color themselves 'c', thus becoming part of group 301c. This re-segmenting is preferably done dynamically based on the factors described above for assigning colors to nodes 201.

Figure 3:
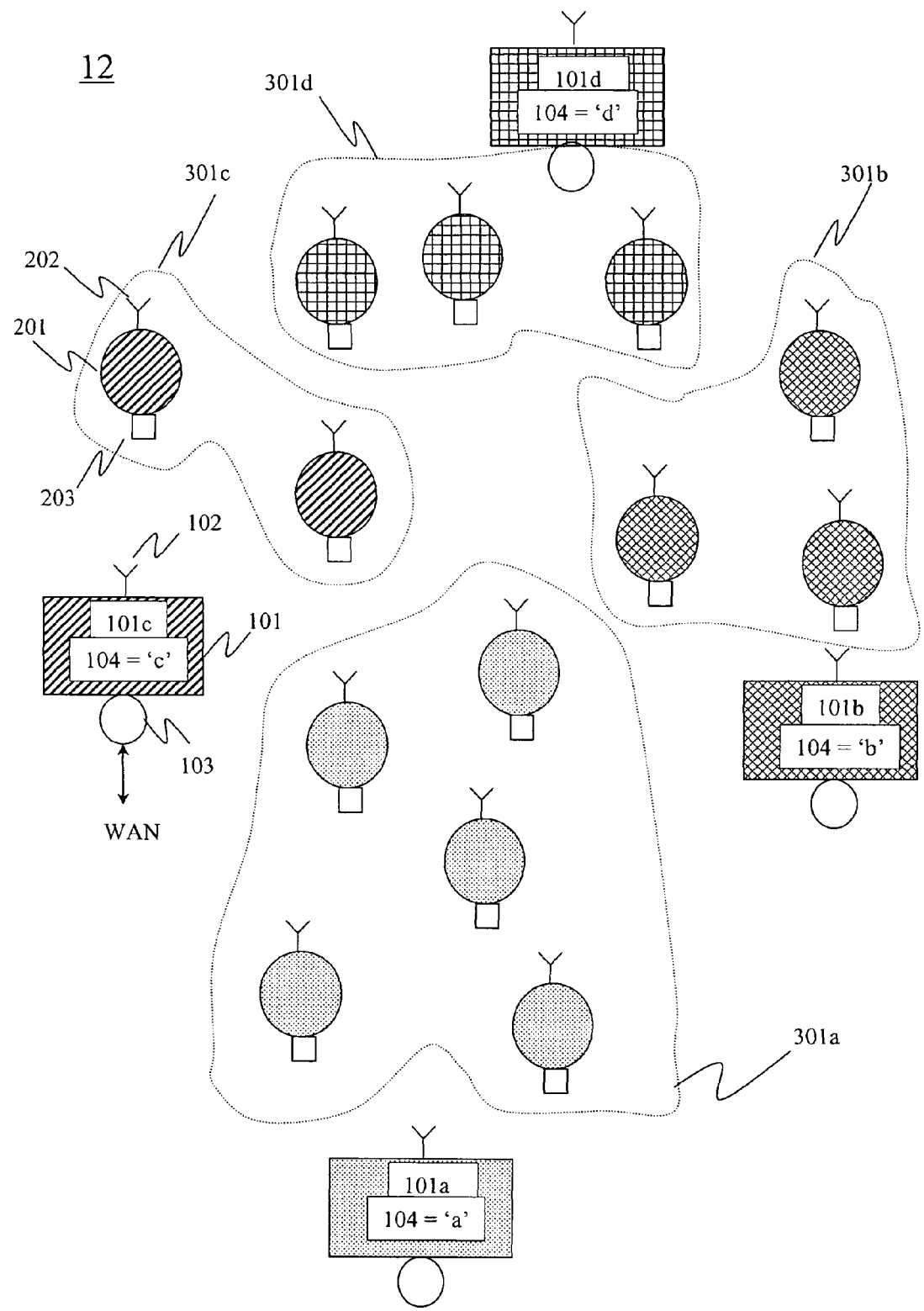
FIG. 3 is a block diagram illustrating an embodiment of a system for automatically segmenting and merging routing domains within networks.

In a similar manner, the introduction of new gateways 101 into network 12 is easily facilitated as well. With reference now to FIG. 3, shown is an embodiment of system for automatically segmenting and merging routing domains within networks when a new gateway 101d is introduced into network 12. New gateway 101d has color 'd'. Some of nodes 201 could select gateway 101d as their primary gateway because it is advantageous for these nodes 201 to do so based, e.g., on the selection criteria discussed above. Consequently, network 12 re-organizes itself into four (4) segments or groups of nodes 201, groups 301a, 301b, 301c and 301d.

In such cases when node 201 selects different gateway 101 as its primary gateway and, therefore, switches color, it will be noted that node 201 might have entries in its local routing table which are of the previous (different) color than the new color it has just chosen. These older color entries can be deleted immediately. Alternatively, these older color entries can be marked as stale entries and deleted later. This allows other nodes 201 in the vicinity to learn of the stale entries and mark them as stale themselves and delete such entries later.

Figure 4:
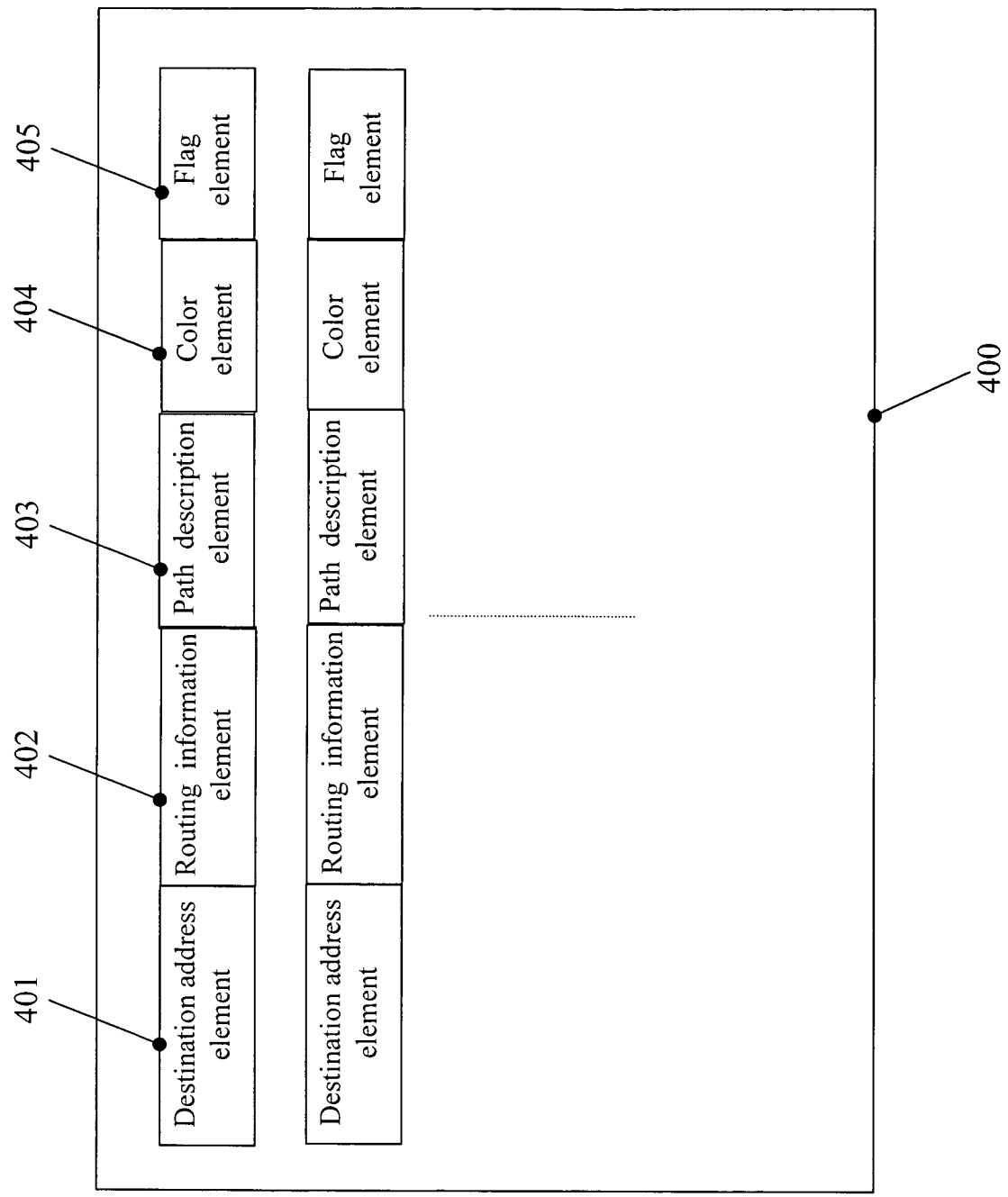
FIG. 4 is a diagram illustrating a routing table in an embodiment of a system for automatically segmenting and merging routing domains within networks.

With reference now to FIG. 4, more specific details of an exemplary embodiment system for automatically segmenting and merging routing domains within networks are now described. First, an example of the form of the routing information stored locally at each node 201 and exchanged between nodes 201 is shown. The information is stored in routing table 400 in the form of entries, each entry describing a destination in network 12. For each entry, there is a destination address element 401, a routing information element 402, a routing path description element 403, a color element 404 and a flag element 405. Destination address element 401 may be a unique address pertaining to the radio device of the destination such as a Media Access Control (MAC) address or a network address. Routing information element 402 may be, for example, the address of the device to be used as the next hop to reach the destination. Routing path description element 403 contains information used to make decisions on which path is better to reach a particular destination. Such information might include a description of the quality of the wireless links in the routing path in the form of a suitable metric, the number of hops etc. Color element 404 shows the color of the destination, i.e., the color the destination node has selected for itself. Flag element 405 contains various flags that describe the destination, such as whether the destination is a gateway, whether the destination is a stale entry marked for deletion, etc.

Figure 5:
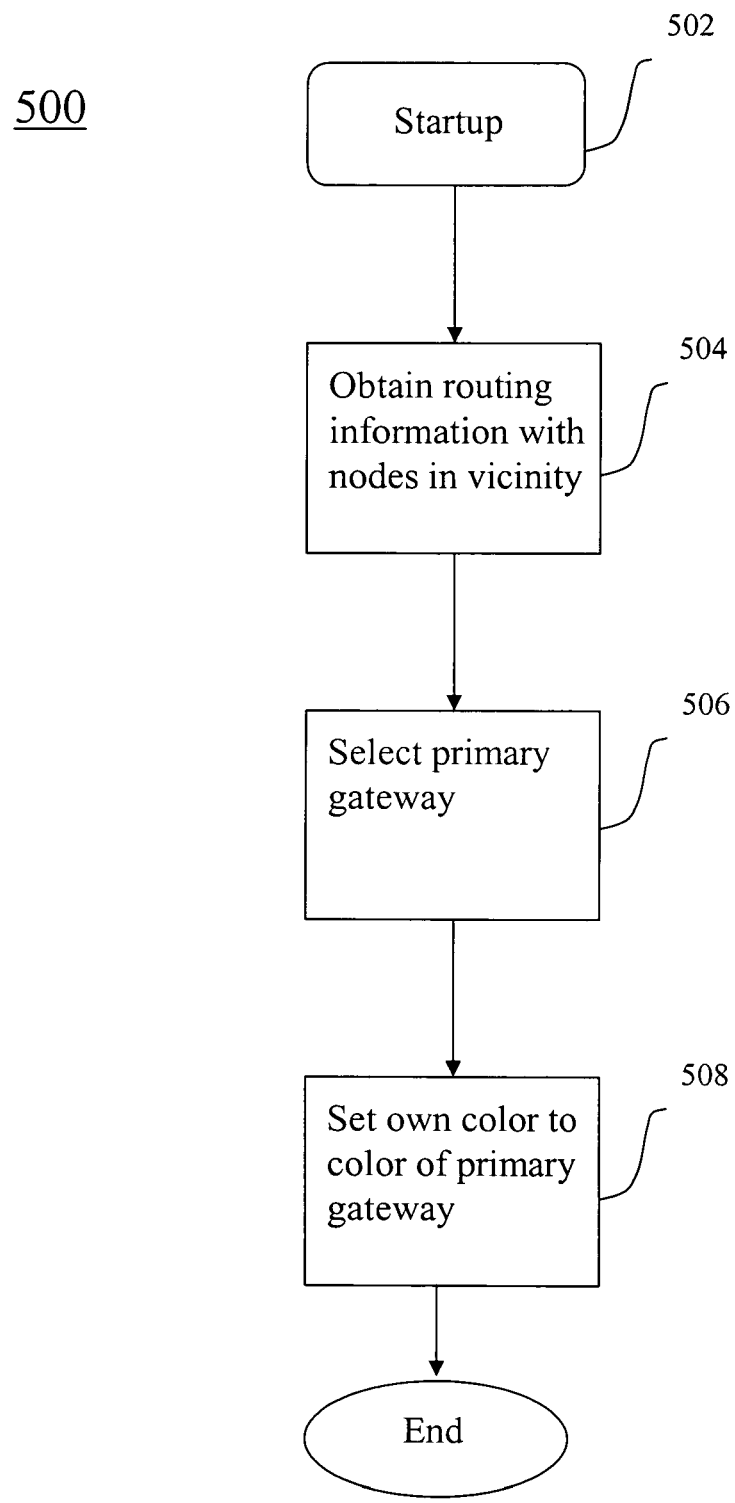
FIG. 5 is a flowchart illustrating an embodiment of a method for automatically segmenting and merging routing domains within networks.
Figure 6:
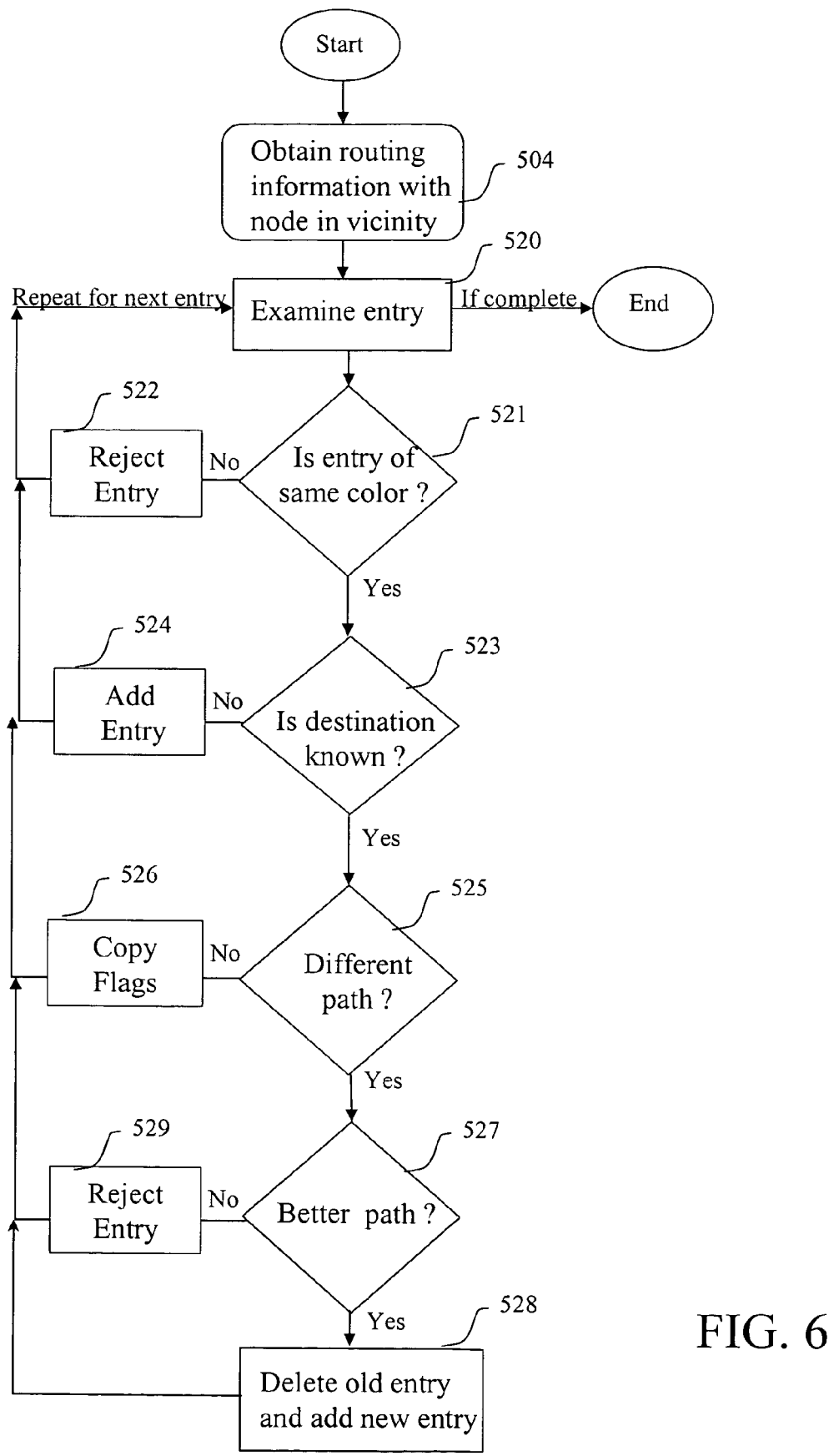
FIG. 6 is a flowchart illustrating an embodiment of a method for automatically segmenting and merging routing domains within networks.
Figure 7:
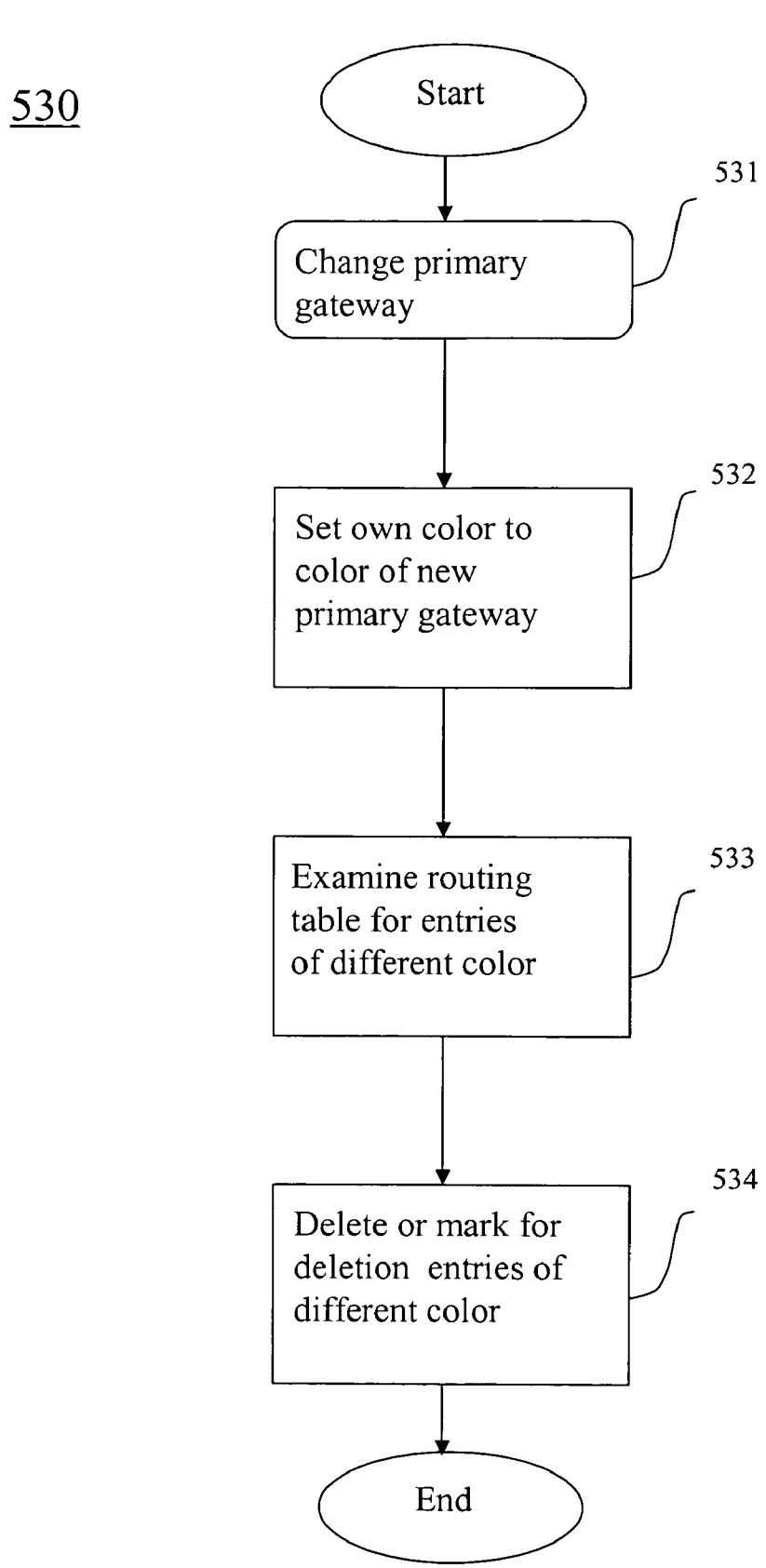
FIG. 7 is a flowchart illustrating an embodiment of a method for automatically segmenting and merging routing domains within networks.

With reference now to FIGS. 5-7, shown are embodiments of methods for automatically segmenting and merging routing domains within networks. These methods or processes may be used at nodes 201. Referring to FIG. 5, an embodiment of method 500 for automatically segmenting and merging routing domains within networks that is used at each node 201 on startup is shown. Upon startup, block 502, each node 201 discovers other nodes 201 in the vicinity and obtains the routing table information described above from other nodes 201 in the vicinity, block 504. Based on the information obtained, node 201 selects a primary gateway based on one more of the criteria described earlier, block 506. Node 201 then chooses as its own color the color of gateway 101 it has chosen as its primary gateway, block 508.

With reference now to FIG. 6, shown is an embodiment of obtaining the routing information 504. An exemplary process used at each node 201 when it obtains the routing information from a neighboring node is shown. As described earlier the routing information may be in the form of a list of entries each of which is in the form shown in FIG. 4. Node 201 considers each of these entries in turn, block 520. Node 201 determines if entry is marked with the same color as node 201, block 521. If an entry is marked with a color element 404 that is different from the node's own color, node 201 rejects the entry, block 522. If an entry is marked with a color element 404 that is the same as the node's color, node 201 considers the entry for either addition or modification. Node 201 consults its local routing table 400 and considers whether the destination described in the entry is already contained in the local routing table (is destination known?), block 523. If the entry is for a destination that is unknown to node 201, that entry is added to the local routing table, block 524. If the entry is for a destination that is already contained in the local routing table 400, node 201 then considers whether the entry describes a different path to the same destination, block 525. If it is not a different path to the destination, node 201 simply copies the flag elements to the existing entry in the local routing table 400, block 526. If it is a different path, node 201 then considers whether the new path is a better path to the same destination than the one already present in the local routing table 400, block 527. If the new path is better, the existing entry in the local routing table 400 is deleted and the new entry is added, block 528. If the new path is not better, the new entry is rejected, block 529.

With reference now to FIG. 7, shown is another embodiment of a method 530 for automatically segmenting and merging routing domains within networks. The embodiment shown is a process that may be used at node 201 when node 201 switches its primary gateway. Node 201 can switch its primary gateway, block 531, based on a consideration of number of factors. These factors can be used alone or in conjunction with or without appropriate weighting factors. For instance, by examining the size of its routing table 400, node 201 can form conclusions about the total size of its present sub-network or routing domain (e.g., group or segment 301). In other words, node 201 can calculate how many other nodes 201 have selected the same primary gateway as itself. Through setting appropriate thresholds, such as, for example, a threshold for the total number of nodes 201 in a sub-network, node 201 is then enabled to detect when a sub-network has grown too large and to switch to a different primary gateway when such thresholds are exceeded. Alternatively, node 201 can perform more sophisticated calculations such as, for example, how much total traffic is flowing into its primary gateway and use thresholds for that total traffic as a basis for switching primary gateways as well. Alternatively, node 201 could use more traditional metrics such as a count of the total number of hops to its primary gateway or the quality of the wireless links in the path to its primary gateway as a basis for switching to a different gateway. Furthermore, node 201 can use a combination of all the above factors as well as other factors, in making a decision to switch to a different primary gateway. When node 201 switches its primary gateway it first changes its own color to the color of the new primary gateway, block 532. Node 201 then searches its local routing table 400 for destinations that are not of the same color as its new color, block 533. All entries that are not of the new color of the node are either deleted immediately or marked as stale in the flag element for the entry, block 534.

From the above it is seen that by using the color attribute in each gateway 101 and the processes described above to exchange routing information, the embodiments described herein provide the benefits of restricting the size of routing tables 400 in nodes 201 while at the same time allowing for the dynamic sub-division of the whole network 12 into segments 301, the merging of different segments into a large segment, and the re-organization of segments.

Modifications and variations to the above embodiments can be done to change or improve various performance aspects of the system. For example, one modification to the method described in FIG. 6 would be to always consider an entry that describes a gateway destination for addition or modification regardless of color. This modification would allow nodes 201 to store a path to all gateway destinations and might allow a quicker change of the primary gateway when gateways 101 fail or when wireless link conditions change. Since the number of gateways 101 in network 12 would be very small in relation to the number of nodes 201 in network 12, this modification would allow the improved performance aspect of switching to a different primary gateway faster to be achieved without significantly diluting the benefits of restricting the local routing table size.

Moreover, it will be further noted that although the embodiments described above use gateways 101 and unique color attributes in gateways 101 as the central mechanism of achieving a dynamic, self-organizing segmentation effect of network 12, the concept could just as easily be extended to nodes 201 as well and need not be restricted to gateways 101. Consequently, for example, specially designated nodes 201 could function as network segment organizers, identified as such to network 12, and possess unique color attributes. Other nodes 201 in the system would then select which segment organizer to attach in a manner similar to the selection of the primary gateway described in the above embodiments and, therefore achieve the same or similar benefits as described above.

Further enhancements and added features to the system and the means described in the foregoing embodiment will readily occur to those well versed in the art. All such modifications, changes, extensions, variations and other uses and applications which do not depart from the spirit and scope of the invention are deemed to be covered by the invention which is limited only by the claims which follow.

The invention claimed is:

1. A system for automatically segmenting and merging routing domains within a network, comprising:
    a plurality of gateway devices; and
    a plurality of nodes self-segmented into one or more routing domains in which:
        each of said plurality of nodes dynamically selects a single gateway device from among said plurality of gateway devices as the node's primary gateway at any time;
        each of said gateway devices possesses a gateway color attribute, in which the value of the said gateway color attribute is unique for each gateway;
        each of said plurality of nodes maintains a node color attribute value whose value is automatically derived from the value of said gateway color attribute of the node's primary gateway that is determined through direct connectivity to the gateway or through other nodes connected to the gateway; and
        each node's routing domain is determined by the node's color attribute value, wherein
            a first node changes its selection from a first gateway device to a second gateway device based on the number of nodes associated with the first gateway device exceeding a threshold;
            the first node automatically derives a new color attribute value from a color attribute value of the second gateway;
            the first node, after changing its selection to the second gateway device, updates a local routing table to remove entries not associated with the second gateway device; and
            the first node, after updating the local routing table, conveying the updated local routing table to least one other node.

2. The system of claim 1 in which said node color attribute value in each of said plurality of nodes is equal to the value the said gateway color attribute of the primary gateway of that node.

3. The system of claim 1 further comprising:
    a plurality of routing tables, in which each of said plurality of nodes maintains a routing table containing only entries that describe paths to destination nodes whose node color attribute value is equal to or otherwise related to each node's node color attribute value.

4. The system of claim 1 further comprising:
    a plurality of routing tables, in which each of said gateway devices maintains a routing table containing only entries that describe paths to destination nodes whose node color attribute value is equal to or otherwise related to each gateway devices' gateway color attribute value.

5. The system of claim 1 further comprising:
    a plurality of routing tables, in which each of said plurality of nodes maintains is routing table containing only entries that describe paths to a gateway device.

6. The system of claim 1 further comprising:
    a plurality of routing tables, in which each of said plurality of nodes maintains a routing table containing only entries that describe a path to a destination node or gateway device with whom direct communication is possible.

7. The system of claim 1 further comprising:
    a plurality of routing tables, in which each of said plurality of nodes maintains a routing table containing only entries that describe paths to each node's primary gateway.

8. The system of claim 1 further comprising:
    a plurality of routing tables, in which each of said gateway devices maintains a routing table containing only entries that describe paths to a gateway device.

9. The system of claim 1 further comprising:
    a plurality of routing tables, in which each of said gateway devices maintains a routing table containing only entries that describe a path to a destination node or gateway device with whom direct communication is possible.

10. The system of claim 1 in which the one or more gateway devices and plurality of nodes segmented into one or more routing domains form a first network.

11. The system of claim 10 in which said gateway devices are operative for communicating in the first network as well as in a second network.

12. The system of claim 10 in which the one or more routing domains are sub-networks of the first network.

13. The system of claim 1 in which one or more of said one or more gateway devices are specially designated nodes operatively equivalent to other nodes except that the specially designated nodes include different gateway color attributes.

14. A method for automatically segmenting and merging routing domains within a network, in which the network includes one or more gateway devices and a plurality of nodes, the method comprising:
    providing a local routing table at each of said nodes and gateway devices;
    providing a gateway color attribute in each gateway device;
    setting the gateway color attribute in each gateway device to a value, in which said setting comprises setting the gateway color attribute in each gateway device to a unique value;
    each of said nodes dynamically selecting a gateway device as said node's primary gateway;
    each of said nodes automatically setting a node color attribute whose value is derived from the value of the gateway color attribute of said node's primary gateway;
    changing, by a first node, the primary gateway selection from as first primary gateway to a second primary gateway based on the number of nodes along a path associated with the first primary gateway exceeding a threshold;

deriving the first node's node color attribute value from the second primary gateway;

updating the first node's local routing table to remove entries that are not associated with the second primary gateway after changing to the second primary gateway; and after updating the local routine table, the first node conveying the updated local routing table to at least one other node.

15. The method of claim 14 further comprising:

each of said nodes obtaining routing information from other nodes and gateway devices in said node's vicinity and discarding routing information describing destination nodes whose node color attribute value is not related to said node's own node color attribute value.

16. The method of claim 14 further comprising:

each of said gateway devices obtaining routing information from other nodes and gateway devices in the vicinity and discarding routing information describing destination nodes whose node color attribute value is not related to said gateway's gateway color attribute value.

17. The method of claim 14 further comprising each of said nodes obtaining routing information from other nodes and gateway devices in said node's vicinity and discarding routing information describing destination nodes which are not directly communicable with said node and whose node color attribute value is not equal to or otherwise related to said node's node color attribute value.

18. The method of claim 14 further comprising each of said gateway devices obtaining routing information from other nodes and gateway devices in said gateway device's vicinity and discarding routing information describing destination nodes which are not directly communicable with said gateway device and whose node color attribute value is not equal to or otherwise related to said gateway device's gateway color attribute value.

19. The method of claim 14 further comprising each of said nodes and gateway devices obtaining routing information from other nodes and gateway devices in said node's and said gateway device's vicinity and maintaining routing information describing each such gateway device destination.

20. The method of claim 14 in which said setting of said gateway color attribute for each gateway occurs at the time of manufacture of the gateway devices.

21. The method of claim 14 in which said setting of said gateway color attribute for each gateway is performed manually in an operating network.

22. The method of claim 14 in which said setting of said gateway color attribute for each gateway performed automatically by each gateway device.

23. A method for dynamically segmenting a network into multiple sub-networks or routing domains, in which the network includes one or more gateway devices and a plurality of nodes, the method comprising:

providing a local routing table at each of said nodes and gateway devices;

providing a gateway color attribute in each gateway device;

setting the gateway color attribute in each gateway device to a value;

each of said nodes dynamically selecting a gateway device as its primary gateway;

each of said nodes automatically setting a node color attribute whose value is equal to the value of the gateway color attribute of its primary gateway;

each of said nodes obtaining routing information from other nodes and gateway devices in the vicinity and discarding routing information describing destination nodes whose node color attribute value is not equal to its own node color attribute value;

each of said gateway devices obtaining routing information from other nodes and gateway devices in the vicinity and discarding routing information describing destination nodes whose node color attribute value is not equal to its own gateway color attribute value;

changing, by a first node, the primary gateway selection from a first primary gateway to a second primary gateway based on the number nodes associated with the first primary gateway exceeding a threshold;

deriving the first node's node color attribute value from the second primary gateway;

updating the first node's local routing table by removing entries that are not associated with the second primary gateway after changing to the second primary gateway; and after updating local routing table, the first node conveying the undated local routing table to at least one other node.

24. The method of claim 23 in which said node changing the node's selection of primary gateway is performed by said node by considering one or more of a plurality factors including one or more of the following:

the total amount of data traffic flowing into the first primary gateway;

the total amount of traffic flowing into the second primary gateway;

the quality of the wireless links in the path to the first primary gateway;

the quality of the wireless links in the path to the second primary gateway;

the number of hops to the first primary gateway; and the number of hops to the second primary gateway.

25. The method of claim 14 further comprising determining each node's routing domain using the node's color attribute value.

26. The method of claim 23 further comprising determining each node's routing domain using the nodes' color attribute value, wherein the determining includes the step of each of said nodes obtaining routing information from other nodes and gateway devices in the vicinity and discarding routing information describing destination nodes whose node color attribute value is not equal to its own node color attribute value.

* * * * *